Feb. 18, 1930.  G. H. PEAL  1,747,596
CONTAINER AND METHOD AND MEANS OF PRODUCING THE SAME
Filed Nov. 22, 1924
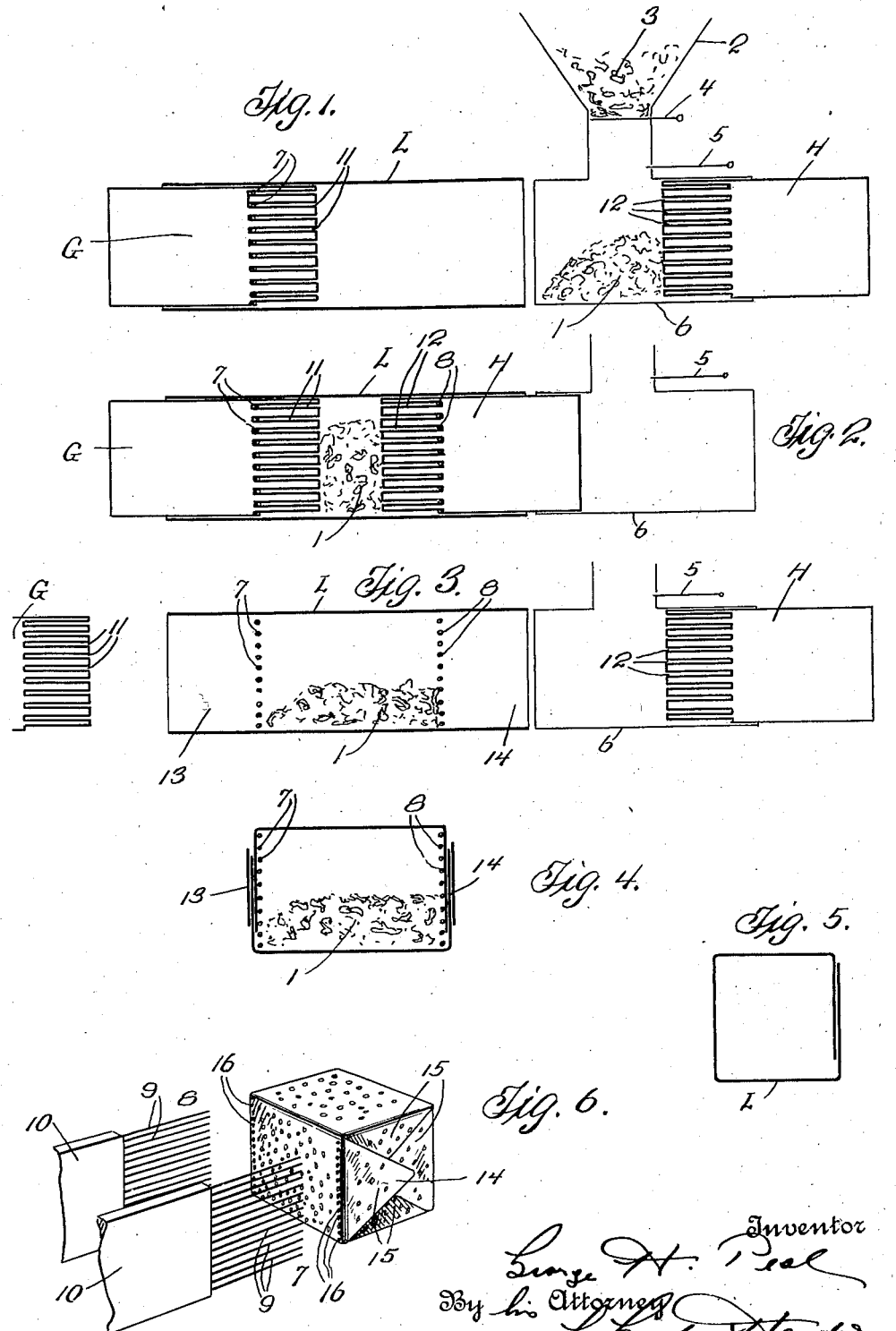

Patented Feb. 18, 1930

1,747,596

UNITED STATES PATENT OFFICE

GEORGE H. PEAL, OF RUTHERFORD, NEW JERSEY

CONTAINER AND METHOD AND MEANS OF PRODUCING THE SAME

Application filed November 22, 1924. Serial No. 751,520.

This invention relates to an improved container and method and means of producing the same.

While the invention as herein disclosed is particularly intended for the production of containers for small amounts of tea, or coffee, or the like, it will nevertheless be understood that it is equally well adapted for the production of containers for numerous other purposes.

An object of the invention is to provide a container which is of simple construction and which may be used for instance as an individual tea or coffee ball of the general type as shown in my pending application, Serial #609,989.

A further object of the present invention is to provide a container, made up from a single piece of thin sheet aluminum or the like and folded about the required quantity of tea or coffee in a manner to leave adequate expansion space within the container, also a method and means for producing such a container.

Other objects and aims of the invention, more or less specific than those referred to above, will be in part obvious and in part pointed out in the course of the following description of the elements, combinations, arrangements of parts and applications of principles constituting the invention, and the scope of protection contemplated will be indicated in the appended claims.

In the accompanying drawings which are to be taken as a part of this specification, and in which I have shown merely a preferred form of embodiment of the invention:—

Fig. 1 illustrates diagrammatically the first step in the production of a filled container according to this invention.

Fig. 2 is a similar view illustrating a further step in the production of the filled container.

Fig. 3 is a similar view illustrating a still further step in the production of the filled container.

Fig. 4 is a similar view illustrating the container filled and closed.

Fig. 5 is a similar view showing a cross section of the tube employed in the formation of the container, and Fig. 6 is a perspective view illustrating a completed container and a part of the device used in its formation.

Referring to the drawings for describing the invention in detail the reference character L indicates a rectangular tube of suitable sheet material, preferably thin sheet aluminum. This rectangular tube is made from a flat sheet of proper size preferably perforated throughout and folded into tube shape as indicated in Fig. 5.

Into one end of the tube is inserted a plunger member G, and a similar plunger member H is adapted to be inserted into the opposite end. Before inserting the plunger H however a quantity of tea or the like as 1 is placed in front of it, as illustrated in Fig. 1, so that when the plunger H enters the tube L the tea 1 will be carried by it into the tube, as suggested by the illustration Fig. 2.

A suitable hopper as 2 may be provided for containing a supply 3 of tea, and suitable valves as 4 and 5 may be associated with this hopper to control the delivery of a measured quantity of tea in front of the plunger H at each operation, the measured quantity being deposited into a suitable chute 6 ready to be slid along and into the tube L by the plunger H.

While the two plungers G and H stand in position within the tube L two sets of partition members as 7 and 8 are inserted and the plungers are withdrawn, as indicated in Fig. 3.

The partition members 7 and 8 consist each of a series of pins as 9—9 carried by a suitable support as 10, the pins being introduced into the tube by being thrust through the material of the tube so that they constitute temporary end walls within the tube.

The plungers G and H are provided with slots 11 and 12 for accommodating the pins and permitting withdrawal of the plungers after the pins have been introduced, it being understood also that the portions of the plungers surrounding said slots constitute a supporting backing for the material of the tube during the time while the pins are being thrust through said material.

With the tea confined between the partition walls 7 and 8, and the tube supported by said walls, the end portions as 13 and 14 of the tube, beyond said walls are folded over about and against said walls in a suitable manner as suggested in Figs. 4 and 6.

The folding over of the end portions of the tube will of course provide wall members as 15 at right angles to the walls of the tube and so interfolded as to thereafter support the structure against collapse.

The pins 9 comprising the partition walls are then withdrawn, and the container is completed.

The withdrawal of the pins 9 will of course leave two rows of apertures as 16—16 in the side of the tube but these apertures are of advantage since they only act as an addition to the number of perforations already present in the tube, which is of course desirable in the manufacture of a tea ball or like container.

It should be noted that while the tube L may be produced by other means than any herein shown yet if desired this tube may be readily formed directly about either one or both of the plunger members G and H. In this instance the first step in the production of the completed article would be that of folding the tube material about one or both of the plungers, after which the procedure will be the same as above set forth.

By this invention a container is produced which may be readily formed from thin sheet metal, such as sheet aluminum, and which has an interior area considerably greater than that required to accommodate the tea or other material to be brewed. Ample space is left for expansion during the brewing process. The partition wall members 7 and 8 have constituted a sort of "form" about which the material of the container has been folded, and then this "form" has been removed after the container has been filled and closed and without unfolding it.

It is important to note that the "form", comprising the wall members 7 and 8, would not be necessary if the tea could be in sufficient quantity to fill the interior of the container, since in that event the tea itself would constitute a proper "form." In the manufacture of tea balls and the like however the tea cannot more than about half fill the container, thus making it necessary to provide either a temporary form of some kind or to provide other means of closing the container than merely that of folding over integral portions of a one-piece structure.

As many changes could be made in this construction without departing from the scope of the invention as defined in the following claims, it is intended that all matter contained in the above description or shown in the accompanying drawings, shall be interpreted as illustrative only and not in a limiting sense.

It is suggested for instance that in some cases it may be desirable to utilize only a single plunger, in which case one end portion of the tube would be folded about the end of the plunger, the plunger meanwhile serving as a "form." The plunger in this instance could be concaved at its end so as to accommodate the tea. The partition pins would be required only at the opposite end of the tube and could be inserted, the plunger withdrawn, and said opposite end portion of the tube be folded about said pins in the same manner as above set forth.

Having thus described my invention, what I claim as new and desire to secure by Letters Patent is:—

1. The herein-described method of producing a container from a single piece of sheet material, which consists in forming said sheet of material into a tube, introducing a form into said tube, folding the end portions of said tube about said form to close the container, and then removing the form.

2. The herein-described method of producing a container from a single piece of sheet material, which consists in forming said sheet of material into a tube, introducing a form into said tube by projecting it through the material comprising the tube, folding the end portions of said tube about said form to close the container, and then removing the form.

3. The herein-described method of producing a container from a single piece of sheet material, which consists in forming said sheet of material into a tube, introducing a form into said tube, said form comprising rows of pins and being introduced into the tube by being projected through the side wall of the tube, each pin comprising the form producing a hole through the material of the side wall, folding the end portions of said tube about said form to close the container, and then removing the form leaving said holes open.

4. The herein-described method of producing a container from a single piece of sheet material, which consists in forming said sheet of material into a tube having a plunger member therein, introducing a quantity of material to be brewed into the tube by means of a second plunger member, introducing a form into the tube by projecting the same through the side wall of the tube while said plunger members are in position within the tube, withdrawing the plunger members, the material to be brewed being meanwhile retained within the tube by said form, folding end portions of the tube about said form, and then withdrawing the form.

5. The herein-described method of producing a container from a single piece of sheet material, which consists in providing a form, folding a single piece of sheet material into tube shape about said form, folding one end of the tube shaped material about said form to close one end of the tube, introducing a second form member into the tube, withdrawing the first form member, folding the opposite end portions of the tube about said second form member, and then removing said second form member.

6. The herein-described method of producing a container from a single piece of sheet material, which consists in forming said sheet of material into a tube, introducing a form into said tube, folding end portions of the tube about said form to close one end of the tube, introducing a second form member into the tube, withdrawing the first form member, folding opposite end portions of the tube about the second form member to close said opposite end of the tube, and then withdrawing the second form member.

In testimony whereof I affix my signature.

GEORGE H. PEAL.